United States Patent
Madraswala et al.

(10) Patent No.: US 11,210,025 B2
(45) Date of Patent: Dec. 28, 2021

(54) MEMORY DEVICE INCLUDING CONCURRENT SUSPEND STATES FOR DIFFERENT OPERATIONS

(71) Applicant: Micron Technology, Inc., Boise, ID (US)

(72) Inventors: Aliasgar S. Madraswala, Folsom, CA (US); Purval S. Sule, Folsom, CA (US); Karthikeyan Ramamurthi, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/725,098

(22) Filed: Dec. 23, 2019

(65) Prior Publication Data

US 2020/0133579 A1 Apr. 30, 2020

Related U.S. Application Data

(63) Continuation of application No. 15/216,097, filed on Jul. 21, 2016, now Pat. No. 10,514,862.

(51) Int. Cl.
| | |
|---|---|
| *G06F 12/14* | (2006.01) |
| *G06F 3/06* | (2006.01) |
| *G06F 13/40* | (2006.01) |
| *G06F 13/42* | (2006.01) |

(52) U.S. Cl.
CPC ............ *G06F 3/0659* (2013.01); *G06F 3/061* (2013.01); *G06F 3/0679* (2013.01); *G06F 3/0688* (2013.01); *G06F 13/4068* (2013.01); *G06F 13/4282* (2013.01); *G06F 2213/0026* (2013.01); *G06F 2213/0028* (2013.01); *G06F 2213/0032* (2013.01)

(58) Field of Classification Search
CPC .... G06F 3/0659; G06F 3/0604; G06F 3/0679; G06F 13/4068; G06F 13/4282
USPC ...................................... 365/185.29
See application file for complete search history.

(56) References Cited

U.S. PATENT DOCUMENTS

| | | | |
|---|---|---|---|
| 5,675,540 A | 10/1997 | Roohparvar | |
| 6,201,739 B1 | 3/2001 | Brown et al. | |
| 6,633,950 B1 | 10/2003 | Brown et al. | |
| 7,093,064 B2* | 8/2006 | Dalvi | G06F 12/1433 |
| | | | 711/103 |
| 7,711,918 B2 | 5/2010 | Kim et al. | |
| 10,514,862 B2 | 12/2019 | Madraswala et al. | |

(Continued)

OTHER PUBLICATIONS

U.S. Appl. No. 15/216,097, U.S. Pat. No. 10,514,862, filed Jul. 21, 2016, Memory Device Including Concurrent Suspend States for Different Operations.

(Continued)

*Primary Examiner* — Xiaochun L Chen
(74) *Attorney, Agent, or Firm* — Schwegman Lundberg & Woessner, P.A.

(57) ABSTRACT

Some embodiments include apparatuses and methods using memory cells and a control unit to suspend an erase operation performed on a first portion of the memory cells and to suspend a program operation performed on a second portion of the memory cells while the erase operation is suspended. The control unit includes register circuitry to store status information indicating that the program operation is suspended while the erase operation is suspended.

20 Claims, 4 Drawing Sheets

(56) References Cited

U.S. PATENT DOCUMENTS

| | | | |
|---|---|---|---|
| 2005/0024954 A1* | 2/2005 | Dalvi | G11C 16/10 365/199 |
| 2007/0198768 A1 | 8/2007 | Kim et al. | |
| 2012/0213005 A1 | 8/2012 | Lee | |
| 2013/0198451 A1 | 8/2013 | Hyun et al. | |
| 2016/0163397 A1 | 6/2016 | Sehgal et al. | |
| 2018/0024772 A1 | 1/2018 | Madraswala et al. | |

OTHER PUBLICATIONS

U.S. Appl. No. 15/216,097, Non Final Office Action dated Apr. 14, 2017, 16 pgs.

U.S. Appl. No. 15/216,097, Response filed Aug. 11, 2017, to Non Final Office Action dated Apr. 14, 2017, 9 pgs.

U.S. Appl. No. 15/216,097, Final Office Action dated Sep. 22, 2017, 22 pgs.

U.S. Appl. No. 15/216,097, Response filed Oct. 31, 2017 to Final Office Action dated Sep. 22, 2017, 11 pgs.

U.S. Appl. No. 15/216,097, Advisory Action dated Nov. 16, 2017, 3 pgs.

U.S. Appl. No. 15/216,097, Amendment Under 37 CFR 1.116 filed Nov. 27, 2017 in response to FOAR mailed Sep. 22, 2017 and Advisory Action dated Nov. 16, 2017, 11 pgs.

U.S. Appl. No. 15/216,097, Non Final Office Action dated Mar. 5, 2018, 25 pgs.

U.S. Appl. No. 15/216,097, Response filed May 31, 2018 to Non-Final Office Action dated Mar. 5, 2018, 11 pgs.

U.S. Appl. No. 15/216,097, Final Office Action dated Aug. 31, 2018, 30 pgs.

U.S. Appl. No. 15/216,097, Response filed Oct. 31, 2018 to Final Office Action dated Aug. 31, 2018, 11 pgs.

U.S. Appl. No. 15/216,097, Advisory Action dated Nov. 8, 2018, 3 pgs.

U.S. Appl. No. 15/216,097, Response filed Nov. 30, 2018 to Advisory Action dated Nov. 8, 2018 and Final Office Action dated Aug. 31, 2018, 11 pgs.

U.S. Appl. No. 15/216,097, Non Final Office Action dated Jan. 4, 2019, 29 pgs.

U.S. Appl. No. 15/216,097, Response filed May 3, 2019 to Non Final Office Action dated Jan. 4, 2019, 13 pgs.

U.S. Appl. No. 15/216,097, Notice of Allowance dated Aug. 14, 2019, 8 pgs.

U.S. Appl. No. 15/216,097, 312 Amendment filed Oct. 11, 2019, 8 pgs.

U.S. Appl. No. 15/216,097, PTO Response to Rule 312 Communication dated Oct. 25, 2019, 2 pgs.

U.S. Appl. No. 15/216,097, 312 Amendment filed Oct. 25, 2019, 10 pgs.

U.S. Appl. No. 15/216,097, PTO Response to 312 Communication dated Nov. 12, 2019, 2 pgs.

* cited by examiner

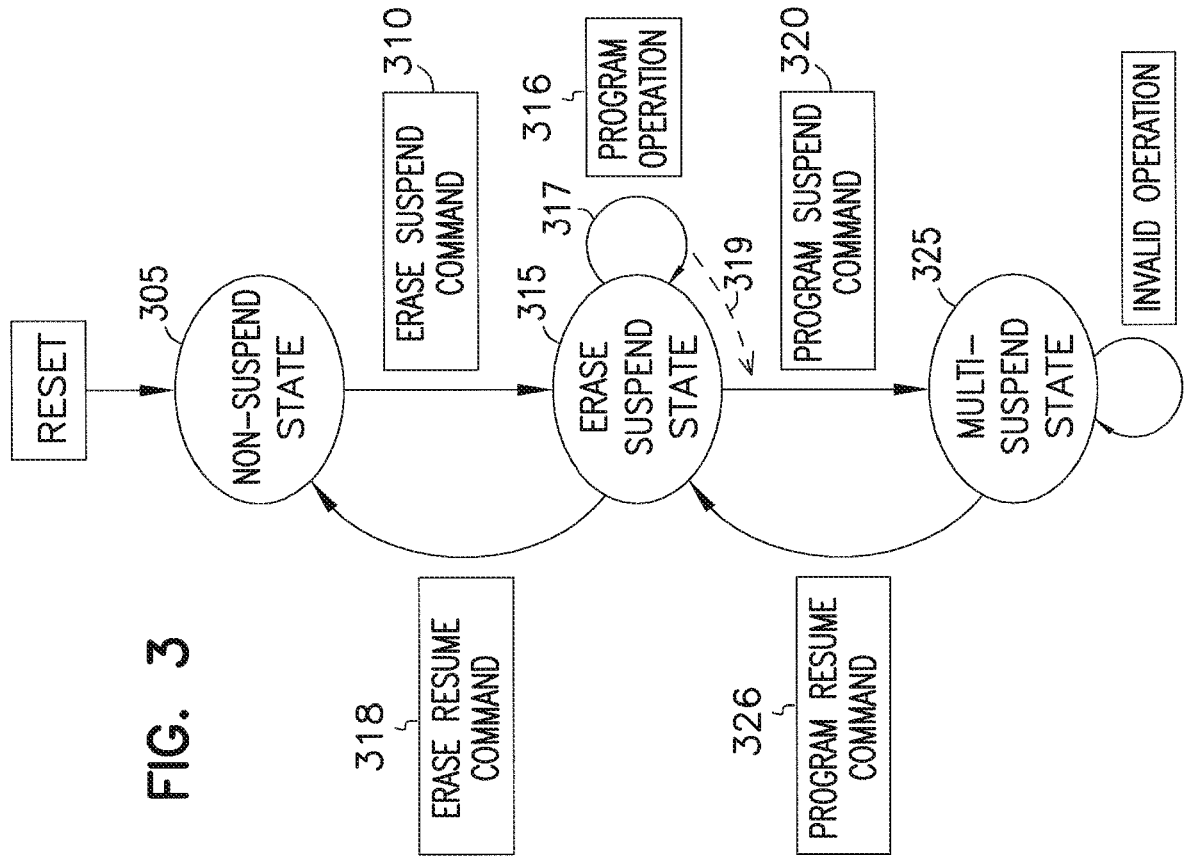
FIG. 3
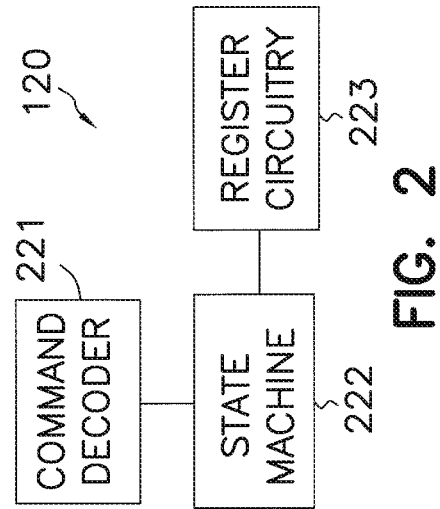
FIG. 2
FIG. 4

500

600

MEMORY DEVICE INCLUDING CONCURRENT SUSPEND STATES FOR DIFFERENT OPERATIONS

PRIORITY APPLICATION

This application is a continuation of U.S. application Ser. No. 15/216,097, filed Jul. 21, 2016, which is incorporated herein by reference in its entirety.

BACKGROUND

Memory devices are widely used in computers and many electronic items to store information. A memory device usually has numerous memory cells. The memory device performs a program operation to store information in the memory cells, a read operation to retrieve the stored information, and an erase operation to erase information (e.g., obsolete information) from some or all of the memory cells. Some conventional memory devices may prioritize their operations, such that an in-progress operation can be suspended if another operation is requested to be performed. In some of these conventional memory devices, only one operation may be suspended at a given time. This may limit the efficiency and quality of service (QoS) in these conventional memory devices.

BRIEF DESCRIPTION OF THE DRAWINGS

FIG. 2 shows a block diagram of a control unit of the memory device of FIG. 1, according to some embodiments described herein.

FIG. 3 shows a state diagram including suspend and resume operations of the memory device of FIG. 1, according to some embodiments described herein.

FIG. 4 shows example contents of register circuitry of the control unit of FIG. 2, according to some embodiments described herein.

DETAILED DESCRIPTION

Figure 1:
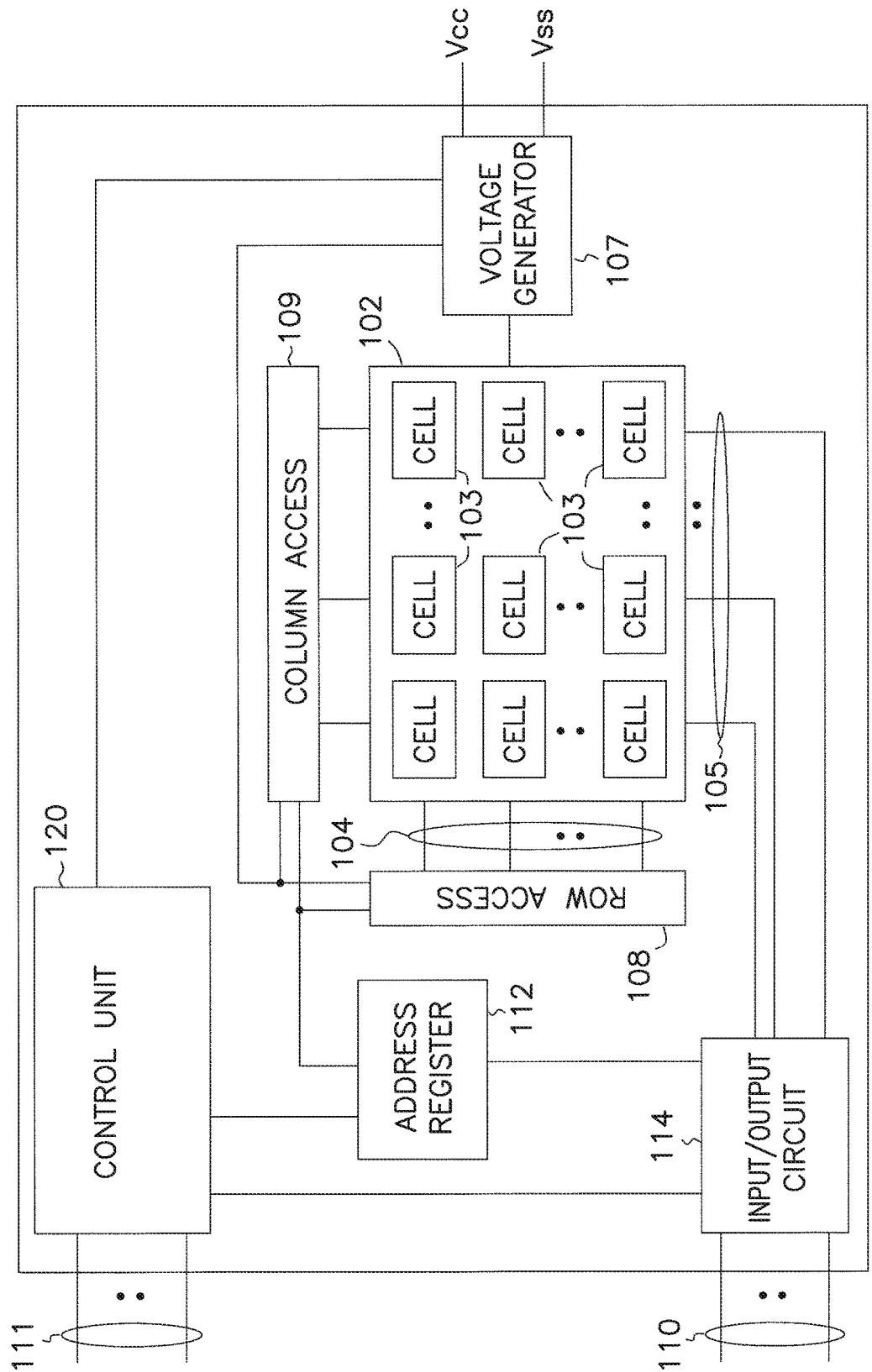
FIG. 1 shows a block diagram of an apparatus in the form of a memory device, according to some embodiments described herein.

FIG. 1 shows a block diagram of an apparatus in the form of a memory device 100, according to some embodiments described herein. Memory device 100 can include a memory array 102 having memory cells 103 that can be arranged in rows and columns along with lines 104 and lines 105. Lines 104 can be part of access lines (e.g., word lines) of memory device 100. Lines 105 can be part of data lines (e.g., bit lines) of memory device 100. Memory device 100 can use lines 104 to access memory cells 103 and lines 105 to provide information to or receive information from memory cells 103.

Memory device 100 can include a non-volatile memory device, and memory cells 103 can include non-volatile memory cells, such that memory cells 103 can retain information stored thereon when power (e.g., supply power) is disconnected from memory device 100. For example, memory device 100 can be a flash memory device, such as a NAND flash or a NOR flash memory device, or another kind of memory device, such as a variable resistance memory device (e.g., a phase change or resistive RAM (Random Access Memory) device).

Memory device 100 can include row access 108 and column access 109 circuitry that can respond to an address register 112 to access memory cells 103 based on row address and column address signals on lines 110, 111, or both. A data input/output circuit 114 can be configured to exchange information between memory cells 103 and lines 110. Lines 110 and 111 can include nodes within memory device 100 or pins (or solder balls) on a package that includes memory device 100. Lines 110 and 111 can be part of a bus (e.g., a NAND bus) to carry information (in the form of signals) to and from memory device 100. The information can include command, address, and data information.

Memory device 100 can include a control unit 120 to control and perform operations of memory device 100 based on signals provided on lines 110 and 111. A device external to memory device 100 can communicate with memory device 100 to send different commands to memory device 100 using different combinations of signals on lines 110, 111, or both. Example commands on lines 110 and 111 include read, program (sometimes referred to as a write), program suspend, program resume, erase, erase suspend, and erase resume commands. The external device that communicates with memory device 100 can be located on an integrated circuit (IC) chip (e.g., a semiconductor die) separate from an IC chip that contains memory device 100. For example, the external device can be a host (which can include a central processing unit (CPU)), a memory controller (e.g., a flash memory controller, such as a NAND memory controller), or other types of controllers.

As shown in FIG. 1, memory device 100 can receive a supply power (e.g., supply voltage), including supply voltages Vcc and Vss. Supply voltage Vss can operate at a ground potential (e.g., having a value of approximately zero volts). Supply voltage Vcc can include an external voltage supplied to memory device 100 from an external power source such as a battery or an alternating current to direct current (AC-DC) converter circuitry. Memory device 100 can include a voltage generator 107 to generate different voltages for use in different operations of memory device 100, such as read, write, and erase operations performed on memory cells 103.

Each of memory cells 103 can be programmed to store information representing a value of a fraction of a bit, a value of a single bit, or a value of multiple bits such as two, three, four, or another number of bits. For example, each of memory cells 103 can be programmed to store information representing a binary value "0" or "1" of a single bit. The single bit per cell is sometimes called a single level cell. In another example, each of memory cells 103 can be programmed to store information representing a value for multiple bits, such as one of four possible values "00", "01", "10", and "11" of two bits, one of eight possible values "000" "001", "010" "011", "100", "101" "110", and "111" of three bits, or one of other values of another number of multiple bits. A cell that has the ability to store multiple bits is sometimes called a multi-level cell (or multi-state cell).

Memory cells 103 can be arranged in a two dimensional (2D) arrangement, such that memory cells 103 can be located on the same device level of memory device 100. Alternatively, memory cells 103 can be arranged in a three dimensional (3D) arrangement, such that some of memory cells 103 can be stacked over some other memory cells 103 in multiple levels over a substrate (e.g., a semiconductor substrate) of memory device 100.

One of ordinary skill in the art may recognize that memory device 100 may include other elements, several of which are not shown in FIG. 1, so as not to obscure the example embodiments described herein.

Memory device 100 can respond to commands (e.g., read, program, program suspend, program resume, erase, erase suspend, and erase resume commands) to perform operations on memory array 102 (e.g., on a portion of memory cells 103) based on the commands. For example, memory device 100 can perform a read operation on memory cells 103 in response to a read command. The read operation retrieves (e.g., reads) information from memory cells 103. Memory device 100 can perform a program operation on memory cells 103 in response to a program command. The program operation stores (e.g., program (sometimes referred to as write)) information in memory cells 103. Memory device 100 can perform an erase operation on memory cells 103 in response to an erase command. The erase operation erases information from a portion of memory cells 103. The erase, program, and read operations can be perform on different portions (e.g., different blocks) of memory cells 103 at a given time. For example, the erase operation can be perform on a portion of memory cells 103, the program operation can be performed on another portion of memory cells 103, and the read operation can be performed on a further portion of memory cells 103.

Memory device 100 can also perform a suspend operation to place an in-progress operation (e.g., erase or program operation) in a suspend state. In some situations, memory device 100 can operate such that multiple operations can be placed in their respective suspend states at a given time. Memory device 100 may perform an operation that may have a higher priority than the operations being suspended. For example, memory device 100 may suspend an erase operation and a program operation and perform a read operation while the erase operation and the program operation are concurrently suspended.

In the example described above, memory device 100 may resume the program operation (the suspended program operation) after the read operation is completed. Then, memory device 100 may resume the erase operation (the suspended erase operation) after the program operation (the resumed program operation) is completed.

Memory device 100 can perform a suspend operation (to place an operation in a suspend state) based on a suspend command and a resume operation based on a resume command. As described above, the suspend and resume commands can be provided to memory device 100 from an external device (e.g., a host or, alternatively, a memory controller). Alternatively, memory device 100 may perform the suspend and resume operations based on internal control information stored in memory device 100, without receiving a resume command from an external device. For example, memory device 100 may store (e.g., automatically store) erase control information (e.g., an internal erase resume command) after it places an erase operation in a suspend state and store program control information (e.g., an internal program resume command). Then, at an appropriate time (e.g., after completion of a read operation performed after the erase and program operations are suspended), memory device 100 may resume the program and erase operations based on the stored erase and program control information.

As mentioned above, some conventional memory devices may suspend an operation (e.g., either an erase or program operation) in order to perform another operation. However, the conventional memory devices may suspend only one operation (either erase or program operation) at a time. This may limit the efficiency and QoS in the conventional memory devices or the system where the conventional memory devices are used.

Unlike some conventional memory devices, memory device 100 can suspend two operations (e.g., suspend an erase operation and then suspend a program operation while the erase operation is suspended) such that they are concurrently in a suspend state. This allows memory device 100 to perform an operation that may have a higher priority than the suspended operations. As an example, a read operation may normally be completed in a shorter time (may be faster to complete) than an erase or program operation. Thus, suspending erase and program operations to perform a read operation (while the erase and program operations are suspended) may improve efficiency and QoS in memory device 100 over some conventional memory devices.

Memory device 100 may be configured such that a read operation has a higher priority than a program operation and a program operation has a higher priority than an erase operation. Thus, based on these priority relationships, memory device 100 may suspend an in-progress erase operation to perform a program operation (e.g., if a program command is received by memory device 100 while the erase operation is performed). Then, memory device 100 may suspend the program operation to perform a read operation (e.g., if a read command is received by memory device 100 while the program operation is performed). Memory device 100 may resume the suspended program operation after the read operation is completed. Then, memory device 100 may resume the suspended erase operation after the program operation is completed. Performing operations in an order described herein (e.g., erase, erase suspend, program, program suspend, read, program resume, and erase resume operations) may improve efficiency, QoS, or both of memory device 100 (or an SSD) that uses memory device 100).

FIG. 2 shows a block diagram of control unit 120 of the memory device of FIG. 1, according to some embodiments described herein. As shown in FIG. 2, control unit 120 can include a command decoder 221, a state machine (e.g., finite state machine) 222, and register circuitry (e.g., status registers) 223. Command decoder 221 can operate to decode information (e.g., signals) provided on lines 111 at memory device 100 in order to determine commands (e.g., read, program, program suspend, program resume, erase, erase suspend, and erase resume commands) associated with operations (e.g., read, program, program suspend, program resume, erase, erase suspend, and erase resume operations) to be performed in memory device 100 (performed on memory cells 103 of on memory array 102). As described above, the information (e.g., commands) on lines 111 may be provided to memory device 100 by an external device (e.g., a memory controller).

State machine 222 can operate to cause memory device 100 to perform operations and to place some operations in different states, depending on the command decoded by command decoder 221. For example, state machine 222 may cause memory device 100 to perform an erase operation based on an erase command decoded by command decoder 221. Then, state machine 222 may place the erase operation in an erase suspend state based on an erase suspend command decoded by command decoder 221. State machine 222 may cause memory device 100 to perform a program operation based on a program command decoded by command decoder 221. Then, state machine 222 may place the program operation in a program suspend state based on a program suspend command decoded by command decoder 221. Memory device 100 may perform a program operation while an erase operation is in the erase suspend state. Thus, by the time state machine places a program operation in a program suspend state, an erase operation may have already been placed in an erase suspend state. Therefore, an erase operation and a program operation can be concurrently in suspend states in memory device 100.

State machine 222 may place a program operation in a program suspend state, while an erase operation is in an erase suspend state, in a situation where retrieving information (a read operation) from memory array 102 is requested (e.g., by a memory controller) while the program operation is performed. State machine 222 may exit the program suspend state in response to a program resume command and continue the program operation (which was suspended). State machine 222 may exit the erase suspend state in response to an erase resume command and continue the erase operation (which was suspended before the program operation).

Register circuitry 223 can operate to store status information that indicates statuses of operations of memory device 100. The status information can include bits (e.g., status bits). The bits can have different values based on different statuses of the operations. For example, a value of a combination of bits may indicate one status of the operation in memory device 100, and another value of a combination of bits may indicate another status of the operation in memory device 100. Memory device 100 may update the values of the bits in register circuitry 223 based on changes in states of the operations of memory device 100. For example, a combination of bits stored in the register circuitry 223 may have a particular value (e.g., may be updated with a particular value) if only an erase operation is in a suspend state (e.g., erase suspend state). If state machine 222 places a program operation in a suspend state while the erase operation is in the erase suspend state, then a register circuitry 223 may change (e.g., update) that particular value to another value to indicate that an erase operation and a program operation are concurrently in suspend states.

FIG. 3 shows a state diagram including suspense and resume operations of memory device 100 of FIG. 1, according to some embodiments described herein. As shown in FIG. 3, memory device 100 can include a reset operation, which can be part of a power-up (e.g., device initialization) process of memory device 100. After the reset operation, memory device 100 may enter a non-suspend state 305.

Memory device 100 may perform an erase operation (e.g., in response an erase command, not shown in FIG. 3) while memory device 100 is in non-suspend state 305. Memory device 100 may suspend the erase operation if it receives an erase suspend command (e.g., a regular erase command) 310. Erase suspend command 310 may be provided by an external device (e.g., a memory controller). Memory device 100 may enter erase suspend state 315 in response to erase suspend command 310. Alternatively, memory device 100 may enter (e.g., automatically enter) erase suspend state 315 without receiving erase suspend command 310. For example, memory device 100 may be configured to operate such that it may automatically enter erase suspend state 315 after an amount (e.g., a predetermined amount) of time has lapsed from the beginning of an erase operation.

Memory device 100 may not enter erase suspend state 315 if erase suspense command 310 is not provided or if memory device 100 is not configured to automatically enter an erase suspend state (e.g., erase suspend state 315). In this case, memory device 100 may complete an erase operation without entering erase suspend state 315. Memory device 100 may also ignore erase suspend command 310 and not enter erase suspend state 315 in some situations and continue to perform the erase operation until the erase operation is finished. For example, memory device 100 may be configured such that it may ignore erase suspend command 310 if erase suspend command 310 is received by memory device 100 when the erase operation is almost finished. As an example, memory device 100 may be configured to ignore an erase suspend command and to not place an in-progress erase operation in an erase suspend state if the in-progress erase operation is at least 90% finished (exceeds a predetermined finished threshold of 90%). The finished threshold value of 90% used here as an example; another threshold value may be used.

As shown in FIG. 3, if memory device 100 is in erase suspend state 315, memory device 100 may perform a program operation 316 (e.g., in response to a program command, not shown in FIG. 3). Then, memory device 100 may go back to non-suspend state 305 or to a multi-suspend state 325, depending on whether a program suspend command is received while program operation 316 is performed.

If no program suspend command is received by memory device 100 while program operation 316 is performed, then memory device 100 may complete program operation 316 and go back to erase suspend state 315 (indicated by activity 317). After program operation 316 is completed, memory device 100 may receive an erase resume command 318 (e.g., normal erase resume command) and perform an erase resume operation. Erase resume command 318 can be provided to memory device 100 by an external device (e.g., a memory controller). After the erase resume operation (in response to erase resume command 318) is completed, memory device 100 may go from erase suspend state 315 back to non-suspend state 305. Alternatively, instead of performing the erase resume operation in response to erase resume command 318, memory device 100 may automatically resume the erase operation that was placed in erase suspend state 315 (resuming the erase operation without receiving erase resume command 318).

If a program suspend command (e.g., program suspend command 320) is received by memory device 100 while program operation 316 is performed, then memory device 100 may not complete program operation 316. Memory device 100 may suspend program operation 316 and enter multi-suspend state 325 (indicated by activity 319). Alternatively, memory device 100 may ignore program suspend command 320 and continue to perform program operation 316 until program operation 316 is finished. For example, memory device 100 may be configured such that it may ignore program suspend command 320 if program suspend command 320 is received by memory device 100 while program operation 316 is almost finished. As an example, memory device 100 may be configured to ignore a program suspend command and not to place an in-progress program operation in a program suspend state if the in-progress program operation is at least 90% finished (exceeds a predetermined finished threshold of 90%). The finished threshold value of 90% used here as an example; another threshold value may be used. The predetermined finished threshold values for erase and program operations can be different. After program operation 316 (FIG. 3) is completed when program suspend command 320 is ignored, memory device 100 may perform an erase resume operation and go back to non-suspend state 305.

If the program suspend command 320 is received and is not ignored, memory device 100 may suspend program operation 316 and enter multi-suspend state 325. Thus, when memory device 100 is in multi-suspend state 325, two different operations are concurrently suspended: the erase operation that was suspended in erase suspend state 315 (e.g., in response to erase suspend command 310) and program operation 316 that was suspended in response to program suspend command 320. Multi-suspend state 325 can be considered as a "nested" suspend state in that one operation (e.g., program operation) can be suspended while another operation (e.g., erase operation) has already been suspended.

Memory device 100 may receive program suspend command 320 (FIG. 3) after memory device 100 receives a read command (not shown in FIG. 3) and while program operation 316 is performed. The read command can be provided to memory device 100 by an external device (e.g., a memory controller). Memory device 100 may perform a read operation in response to the read command. Then, memory device 100 may perform a program resume operation and erase resume operation after the read operation is completed.

Memory device 100 may prevent an invalid operation from being performed while it is in multi-suspend state 325. An invalid operation may include a new erase operation (which is different from the suspended erase operation) or a new program operation (which is different from the suspended program operation). However, a read operation (or read operations) may be performed while memory device 100 is in multi-suspend state 325. For example, control unit 120 of memory device 100 may prevent a new program or new erase operation from being performed while memory device 100 is in multi-suspend state 325. However, control unit 120 of memory device 100 may allow read operations to be performed while memory device 100 is in multi-suspend state 325.

Memory device 100 may receive a program resume command 326 (FIG. 3) from an external device (e.g., a memory controller)) after the read operation (not shown in FIG. 3) is completed and while memory device 100 is in multi-suspend state 325. In response to program resume command 326, memory device 100 may perform a program resume operation to complete the suspended program operation (e.g., program operation 316). After the program resume operation is completed, memory device 100 may receive erase resume command 318. In response to erase resume command 318, memory device 100 may perform an erase resume operation to complete the suspended erase operation (e.g., the erase operation that was suspended in response to erase suspend command 310). After the erase resume operation is completed, memory device 100 may go to non-suspend state 305.

Thus, as described above, memory device 100 may perform different operations (e.g., in the sequential order listed here) that can include erase, erase suspend, program, program suspend, read, program resume, and erase resume operations. Alternatively, a different order may be used. For example, if memory device 100 is in multi-suspend state 325, it may perform the erase resume operation and then the program resume operation after the erase resume operation is finished. However, performing the operations in the order described here may further improve efficiency and QoS of memory device 100.

FIG. 4 shows example contents of register circuitry 223 of FIG. 2, according to some embodiments described herein. As shown in FIG. 4, register circuitry 223 can include registers 401, 401, and 403, and each registry can store a bit, which can have a value (binary value) of "0" or "1." The values of the bits in registers 401, 401, and 403 described herein are binary values. Different values of the bits in registers 401, 402, and 403 can be used to indicate (e.g., report) different statuses of operations performed in memory device 100. Memory device 100 can update the values of the bits in registers 401, 402, and 403 based on the results of operations of memory device 100. Based on the values of the bits stored in registers 401, 402, 403, memory device 100 or an external device (e.g., a memory controller) can determine the statuses of operations (e.g., program and erase suspend operations) performed in memory device 100. Memory device 100 or an external device (e.g., a memory controller) may perform operations (or not perform operations) based on the values of the bits in registers 401, 402, and 403. FIG. 4 shows register circuitry 223 having three registers 401, 402, and 403 as an example. The number of register can vary.

As an example, as shown in FIG. 4, the value (binary value) of 110 (first row from top) in register circuitry 223 may indicate that a program operation was successfully suspended. This means that memory device 100 successfully suspended a program operation in response to a program suspend command. The value of 100 (second row from top) in register circuitry 223 may indicate that a program operation was completed with a pass status (e.g., successfully completed) and a suspend (or resume) command was ignored. The value of 101 (third row from top) in register circuitry 223 may indicate that a program operation was completed with a fail status and a suspend (or resume) command was ignored. The fail status means that some information was unsuccessfully stored in memory cells 103 (FIG. 1). The value of 0X0 (X means their "0" or "1") in register circuitry 223 may indicate that memory device 100 is in multi-suspend state 325. Based on this value (0X0), a new program operation is not allowed (e.g., an invalid program operation), and a new erase operation is also not allowed (e.g., an invalid erase operation). However, a read operation is allowed (a valid read operation) when the combination of the bits in register circuitry 223 have a value of 0X0.

The above example describes values the bits in registers 401, 402, and 403 used for the program operation. However, memory device 100 can also use the bits in registers 401, 402, and 403 for the erase operation. Thus, the values shown in registers 401, 402, and 403 in FIG. 4 are also applicable for the erase operation in memory device 100. For example, the value of 110 in registers 401, 402, and 403 (first row from top) may indicate that an erase operation was successfully suspended. The value of 100 (second row from top) may indicate that an erase operation was completed with a pass status (e.g., successfully completed) and a suspend (or resume) command was ignored. The value of 101 (third row from top) may indicate that an erase operation was completed with a fail status and a suspend (or resume) command was ignored.

In memory device 100, one of the bits in registers 401, 402, and 403 can be used to indicate whether or not the program suspense or erase suspend is successful. This means that the status of program suspend or erase suspend can be determined based on the value of one of the bits in registers 401, 402, and 403. For example, as shown in FIG. 4, if the bit in register 402 has a value of "1" (while the value of each of bits in registers 401 and 403 is not "0,"), then it can be determined that a program (or erase) suspend operation performed at a particular time is successful. In another example shown in FIG. 4, if the bit in register 402 has a value of "0" (while the value of each of bits in registers 401 and 403 is not "0"), then it can be determined that a program (or an erase) suspend operation was ignored. This means that the program (or erase) operation was completed (with either a pass or fail status) and the suspend operation (to suspend the program or erase operation) was not performed.

Thus, as described above with reference to FIG. 4, some values (e.g., 110 and 101) of the combination of the bits in registers 401, 402, and 403 of register circuitry 223 can indicate the suspend status of erase and program operations. A particular value (e.g., 0X0) of the combination of the bits in registers 401, 402, and 403 can be used to indicate that an erase operation and a program operation in memory device 100 are concurrently in suspended states (e.g., nested suspend state).

Figure 5:
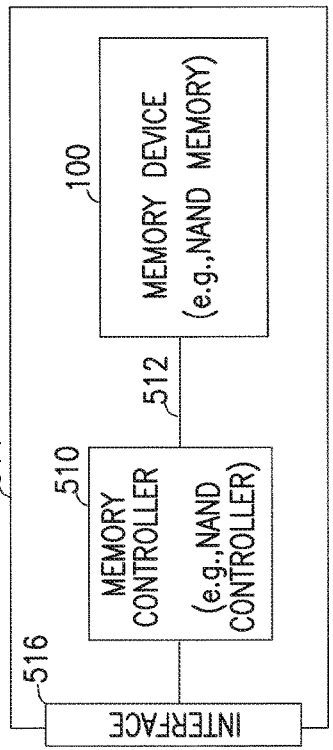
FIG. 5 shows a block diagram of an apparatus in the form of a solid state drive (SSD) including the memory device of FIG. 1, according to some embodiments described herein.

FIG. 5 shows a block diagram of an apparatus in the form of an SSD 500 including a memory device 100, according to some embodiments described herein. SSD 500 can include a memory controller (e.g., NAND memory controller) 510, which can communicate with memory device 100 through lines (e.g., a bus) 512 coupled to memory controller 510 and memory device 100. SSD 500 can include a circuit board (e.g., printed circuit board) 514 where memory controller 510 and memory device 100 are located (e.g., mounted). Lines 512 can include conductive (e.g., metal) traces on circuit board 514. Memory controller 510 can include an IC chip that contains components of memory controller 510. Memory device 100 can include a single IC chip (or multiple IC chips) separate from the IC chip of memory controller 510.

SSD 500 can include an interface 516 to allow memory controller 510 to communicate with another device (e.g., a host). Interface 516 can include components (e.g., connectors and circuitry) that comply with Peripheral Component Interconnect Express (PCIe) specification, Serial Advanced Technology Attachment (SATA) specification, Serial Attached Small Computer System Interface (SAS) specification, or other specifications. Thus, interface 516 may include a connector having a form factor (e.g., physical dimension and conductive terminals) complying with PCIe, SATA, SAS, or other specifications.

Memory controller 510 can operate to receive information (e.g., user data from a host (e.g., a CPU of a system) through interface 516. Then, memory controller 510 can cause memory device 100 to perform a program operation in order to store the information (e.g., store in memory array 102). For example, memory controller 510 can provide a program command on lines 512 to memory device 100, which receives the program command and performs a program operation in response to the program command.

Memory controller 510 can operate to cause memory device 100 to perform a read operation in order to retrieve the stored information from memory device 100. For example, memory controller 510 can provide a read command on lines 512 to memory device 100, which receives the read command and performs a read operation in response to the read command.

Memory controller 510 can operate to cause memory device 100 to perform an erase operation in order to erase some or all of the information stored in memory device 100. For example, memory controller 510 can provide an erase command on lines 512 to memory device 100, which receives the erase command and performs an erase operation in response to the erase command.

Memory controller 510 can operate to cause memory device 100 to perform other operations based on other commands provided to memory device 100 on lines 512. For example, memory controller 510 can provide erase suspend, erase resume, program suspend, and program resume (at different times) on lines 512 to memory device 100. Memory device 100 receives the erase suspend, erase resume, program suspend, and program resume commands and performs erase suspend, erase resume, program suspend, and program resume operations in response to the erase suspend, erase resume, program suspend, and program resume commands, respectively.

As an example, memory device 100 may perform the following operations (in the order listed here) based on commands provided on lines 512. The operations can include erase, erase suspend, program, program suspend, and read operations. After the read operation, memory device 100 can perform program resume and erase resume operations based on commands provided on lines 512. By including memory device 100, SSD 500 may have operating efficiency and QoS similar to those described above with reference to FIG. 1 through FIG. 5.

Figure 6:
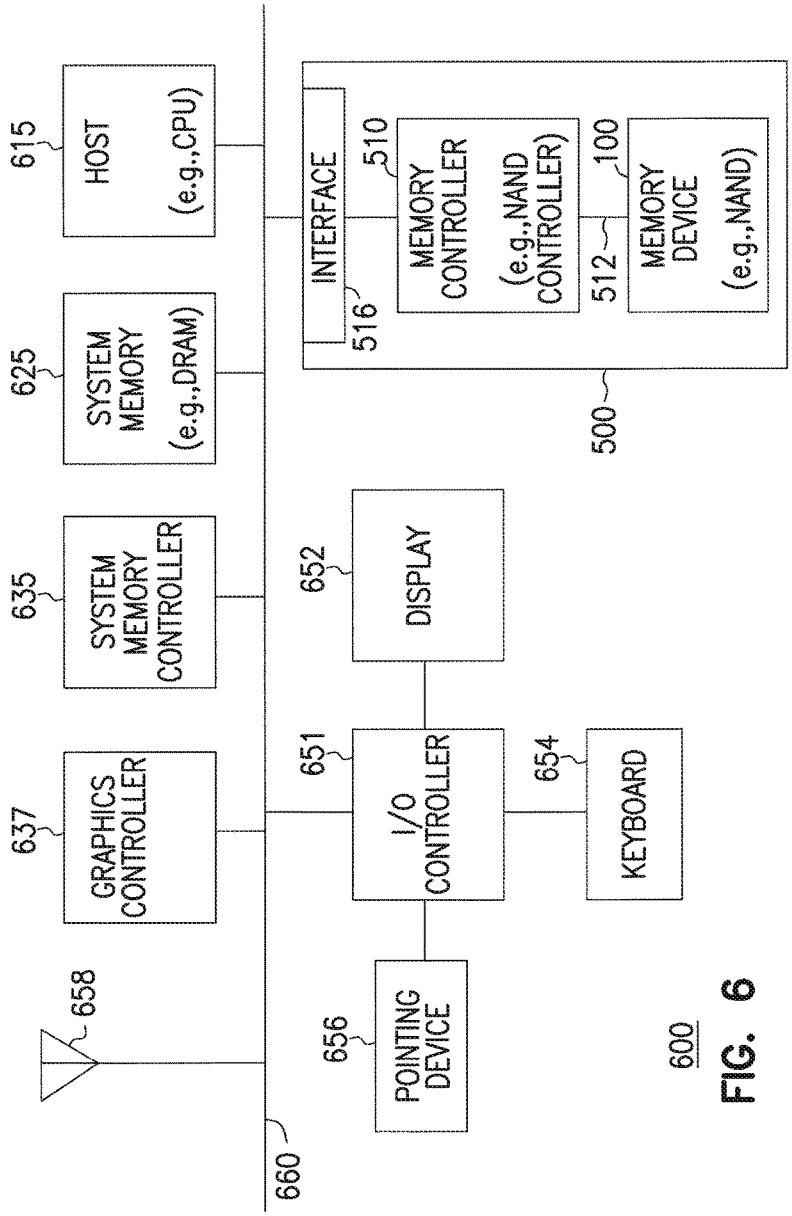
FIG. 6 is a block diagram of an apparatus in the form of a system (e.g., electronic system), according to some embodiments described herein.

FIG. 6 is a block diagram of an apparatus in the form of a system (e.g., electronic system) 600, according to some embodiments described herein. System 600 can include or be included in a computer, a memory storage system, or other types of electronic systems. As shown in FIG. 6, system 600 can include SSD 500, a host controller 615, a system memory 625, a system memory controller 635, a graphics controller 637, an input and output (I/O) controller 651, a display 652, a keyboard 654, a pointing device 656, at least one antenna 658, and a bus 660.

System memory 625 may include a DRAM (Dynamic Random Access Memory) device, an SRAM (Static Random Access Memory) device, a flash memory device, or a combination of these memory devices. I/O controller 651 can include a communication module for wired or wireless communication (e.g., communication through one or more antennas 658). Display 652 can include a liquid crystal display (LCD), a touchscreen (e.g., capacitive or resistive touchscreen), or another type of display. Pointing device 656 can include a mouse, a stylus, or another type of pointing device.

Host controller 615 may include a central processing unit (CPU), which can be part of a general-purpose processor or part of an application specific integrated circuit (ASIC). Host controller 615 can be configured to communicate with SSD 500 through interface 516. For example, host controller 615 and memory controller 510 of SSD 500 may exchange information (e.g., command, address, data (e.g., user data)) through interface 516 in order to store information (processed by host controller 615) in memory device 100 and retrieve information from memory device 100. By including SSD 500 as one of its components, system 600 may have operating efficiency and QoS similar to those of memory device 100 described above with reference to FIG. 1 through FIG. 5.

Figure 7:
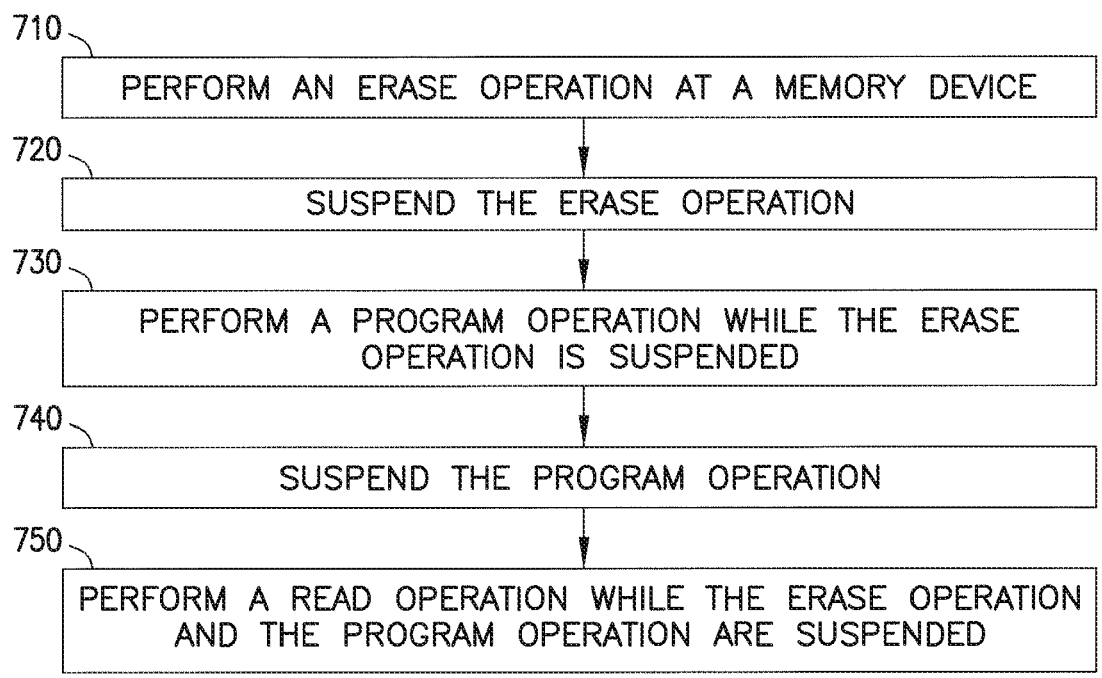
FIG. 7 shows a flowchart illustrating a method of operating a memory device, according to some embodiments described herein.

FIG. 7 shows a flowchart illustrating a method 700 of operating an apparatus (e.g., a memory device), according to some embodiments described herein. Method 700 can be part of an algorithm included in a memory device to allow the memory device to suspend different operations (e.g., erase and program operations) such that they are concurrently in suspend states. The memory device used in method 700 can include memory device 100 described above with reference to FIG. 1 through FIG. 6. Some or all of the activities in method 700 can be implemented by software, firmware, hardware, or any combination of software, firmware, and hardware. As shown in FIG. 7, method 700 can include activities 710, 720, 730, and 740, and 750.

Activity 710 can include performing an erase operation at the memory device. The erase operation may be performed on a portion of the memory cells of the memory device.

Activity 720 can include suspending the erase operation. The erase operation may be suspended in order for a program operation to be performed. The program operation in the memory device may have a higher priority than the erase operation.

Activity 730 can include performing a program operation while the erase operation is suspended. The program operation may be performed on another portion of the memory cells.

Activity 740 can include suspending the program operation. The program operation may be suspended in order for a read operation to be performed. The read operation in the memory device may have a higher priority than the program operation.

Activity 750 can include performing a read operation while the erase operation and the program operation are suspended. The read operation may be performed on a portion the memory cells that is different from the portions of the memory cells associated with the suspended erase and program operations.

Method 700 can include fewer or more activities relative to activities shown in FIG. 7. For example, method 700 can include activities and operations of memory device 100 described above with reference to FIG. 1 through FIG. 6. As an example, method 700 may include receiving erase, program, and read commands (at different times) and performing the erase, program, and read operations in response to the erase, program, and read commands, respectively. In another example, method 700 may include receiving an erase suspend command and performing an erase suspend operation in response to the erase suspend command in order to suspend the erase operation. Method 700 may include receiving a program suspend command and performing a program suspend operation in response to the program suspend command in order to suspend the program operation. In a further example, method 700 may include receiving an erase resume command and performing an erase resume operation in response to the erase resume command in order to resume the erase operation. Method 700 may include receiving a program resume command and performing a program resume operation in response to the program resume command in order to resume the program operation.

Figure 8:
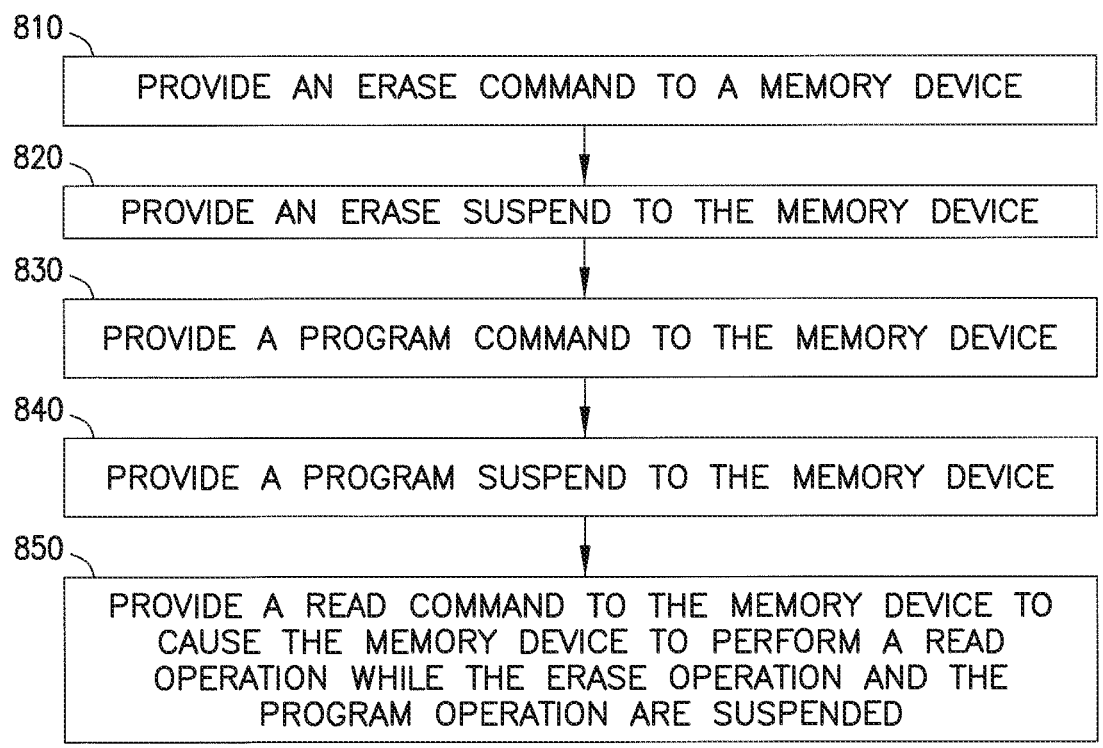
FIG. 8 shows a flowchart illustrating a method of operating a memory controller, according to some embodiments described herein.

FIG. 8 shows a flowchart illustrating a method 800 of operating an apparatus (e.g., a memory controller), according to some embodiments described herein. Method 800 can be part of an algorithm included in a memory controller (e.g., NAND memory controller) to cause a memory device to suspend different operations (e.g., erase and program operations) such that they are concurrently in suspend states. The memory controller used in method 800 can include memory controller 510 described above with reference to FIG. 5. Some or all of the activities in method 800 can be implemented by software, firmware, hardware, or any combination of software, firmware, and hardware. As shown in FIG. 8, method 800 can include activities 810, 820, 830, and 840, and 850. In method 800, commands are provided from a memory controller to a memory device.

Activity 810 can include providing an erase command to a memory device to cause the memory device to perform an erase operation. Activity 820 can include providing an erase suspend command to the memory device to cause the memory device to suspend the erase operation. The erase suspend command can be provided to the memory device before completion of the erase operation. Activity 830 can include providing a program command to the memory device to cause the memory device to perform a program operation. Activity 840 can include providing a program suspend command to the memory device to cause the memory device to suspend the program operation. The program suspend command can be provided to the memory device before completion of the program operation. Activity 850 can include providing a read command to the memory device to cause the memory device to perform a read operation while the erase operation and the program operation are suspended.

Method 800 can include fewer or more activities relative to activities shown in FIG. 8. For example, method 800 can include activities and operations of memory controller 510 described above with reference to FIG. 5 and FIG. 6.

The illustrations of apparatuses (e.g., memory device 100, SSD 500, and system 600) and methods (e.g., methods 700 and 800 and operating methods associated with memory device 100, SSD 500, and system 600) are intended to provide a general understanding of the structure of various embodiments and are not intended to provide a complete description of all the elements and features of apparatuses that might make use of the structures described herein. An apparatus herein refers to, for example, either a device (e.g., memory device 100 or SSD 500) or a system (e.g., system 600 that includes a device such as memory device 100 and SSD 500.

Any of the components described above with reference to FIG. 1 through FIG. 8 can be implemented in a number of ways, including simulation via software. Thus, apparatuses (e.g., memory device 100, SSD 500, and system 600 or part of each of memory device 100, SSD 500, and system 600, including a control unit in these memory devices, such as control unit 120 (FIG. 1)) described above may all be characterized as "modules" (or "module") herein. Such modules may include hardware circuitry, single and/or multi-processor circuits, memory circuits, software program modules and objects and/or firmware, and combinations thereof, as desired and/or as appropriate for particular implementations of various embodiments. For example, such modules may be included in a system operation simulation package, such as a software electrical signal simulation package, a power usage and ranges simulation package, a capacitance-inductance simulation package, a power/heat dissipation simulation package, a signal transmission-reception simulation package, and/or a combination of software and hardware used to operate or simulate the operation of various potential embodiments.

Memory device 100, SSD 500, and system 600 may be included in apparatuses (e.g., electronic circuitry) such as high-speed computers, communication and signal processing circuitry, single or multi-processor modules, single or multiple embedded processors, multicore processors, message information switches, and application-specific modules including multilayer, multichip modules. Such apparatuses may further be included as subcomponents within a variety of other apparatuses (e.g., electronic systems), such as televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

The embodiments described above with reference to FIG. 1 through FIG. 8 include apparatuses and methods using memory cells and a control unit to suspend an erase operation performed on a first portion of the memory cells and to suspend a program operation performed on a second portion of the memory cells while the erase operation is suspended. The control unit includes register circuitry to store status information indicating that the program operation is suspended while the erase operation is suspended. Other embodiments including additional apparatuses and methods are described.

The above description and the drawings illustrate some embodiments of the invention to enable those skilled in the art to practice the embodiments of the invention. Other embodiments may incorporate structural, logical, electrical, process, and other changes. Examples merely typify possible variations. Portions and features of some embodiments may be included in, or substituted for, those of others. Many other embodiments will be apparent to those of skill in the art upon reading and understanding the above description.

What is claimed is:

1. An apparatus comprising:
a memory array comprising memory cells; and
a memory device control unit configured to perform operations on e memory array, the operations comprising:
performing a first erase operation on a first portion of the memory cells;
receiving a first program command for a second portion of the memory cells, and suspending the first erase operation in response to the first program command;
in response to the first program command, performing a first program operation on the second portion of the memory cells while the first erase operation is suspended;
receiving an additional command that requires suspension of the first program operation, wherein the additional command is received while the first program operation is not suspended;
determining whether the first program operation has exceeded a finished threshold; and
in response to determining that the first program operation has exceeded the finished threshold, ignoring the additional command.

2. The apparatus of claim 1, wherein the operations further comprise:
performing a second erase operation on a third portion of the memory cells;
receiving a second program command for a fourth portion of the memory cells, and suspending the second erase operation in response to the second program command;
in response to the second program command, performing the second program operation on the fourth portion of the memory cells while the second erase operation is suspended;
receiving a subsequent command that requires suspension of the second program operation;
determining whether the second program operation has exceeded a finished threshold;
in response to determining that the second program operation has not exceeded the finished threshold, suspending the second program operation, and executing the subsequent command.

3. The apparatus of claim 2, wherein executing the subsequent command includes performing a read operation on a fifth portion of the memory cells while the second erase operation and the second program operation are suspended.

4. The apparatus of claim 3, wherein the memory device control unit is to resume the second program operation after the read operation is completed.

5. The apparatus of claim 3, wherein the memory device control unit is to resume the second erase operation after the read operation is completed.

6. The apparatus device of claim 3, wherein the memory device control unit is to prevent an additional operation from being performed while the second program operation and the second erase operation are suspended.

7. The apparatus of claim 1, wherein the memory device control unit includes register circuitry to store status information as to one or more ongoing operations.

8. The apparatus of claim 1, wherein the memory device control unit includes a register to store a bit to indicate whether the first erase operation is successfully suspended and whether the first program operation is successfully suspended.

9. An apparatus comprising:
a memory device comprising memory cells; and
a memory controller to cause the memory device to perform operations on the memory cells, the operations comprising:
performing a first erase operation on a first portion of the memory cells;
receiving a first program command for a second portion of the memory cells, and suspending the first erase operation in response to the first program command;
in response to the first program command, performing a first program operation on the second portion of the memory cells while the first erase operation is suspended;
receiving an additional command that requires suspension of the first program operation, wherein the additional command is received while the first program operation is not suspended;
determining whether the first program operation has exceeded a finished threshold; and
in response to determining that the first program operation has exceeded the finished threshold, ignoring the additional command.

10. The apparatus device of claim 9, wherein the operations further comprise:
performing a second erase operation on a third portion of the memory cells;
receiving a second program command for a fourth portion of the memory cells, and suspending the second erase operation in response to the second program command;
in response to the second program command, performing the second program operation on the fourth portion of the memory cells while the second erase operation is suspended;
receiving a subsequent command that requires suspension of the second program operation;
determining whether the second program operation has exceeded a finished threshold;
in response to determining that the second program operation has not exceeded the finished threshold, suspending the second program operation, and executing the subsequent command.

11. The apparatus device of claim 9, wherein the memory controller is to cause the memory device to:

perform a second erase operation on a third portion of the memory cells;

suspend the second erase operation in response to an erase suspend command; and perform a second program operation on a fourth portion of the memory cells while the second erase operation is suspended.

12. The apparatus device of claim 11, wherein the memory controller is to cause the memory device to:

suspend the second program operation in response to a program suspend command; and perform a read operation on a fifth portion of the memory cells while the second erase operation and the second program operation are suspended.

13. The apparatus device of claim 12, wherein the memory controller is to cause the memory device to resume the second program operation and the second erase operation after the read operation is completed.

14. The apparatus device of claim 12, wherein the memory device is to prevent an additional erase operation from being performed while the second program operation and the second erase operation are suspended.

15. The apparatus device of claim 12, wherein the memory device is to prevent an additional program operation from being performed while the second program operation and the second erase operation are suspended.

16. A solid state drive comprising:

an interface;

a memory controller coupled to the interface; and a memory device coupled to the controller, the memory controller configured to cause the memory device to perform operations, the operations comprising:

performing a first erase operation on a first portion of the memory cells;

receiving a first program command for a second portion of the memory cells, and suspending the first erase operation in response to the first program command;

in response to the first program command, performing a first program operation on the second portion of the memory cells while the first erase operation is suspended;

receiving an additional command that requires suspension of the first program operation, wherein the additional command is received while the first program operation is not suspended;

determining whether the first program operation has exceeded a finished threshold; and in response to determining that the first program operation has exceeded the finished threshold, ignoring the additional command.

17. The solid state drive of claim 16, wherein the memory device includes a command decoder to decode information received from the memory controller to provide the first program command and the additional command.

18. The solid state drive of claim 17, wherein the command decoder is to decode additional information received from the memory controller and provide an erase resume command to cause the memory device to resume the first erase operation.

19. The solid state drive of claim 16, wherein the interface includes a connector having a form factor complying with one of Peripheral Component Interconnect Express (PCIe) specification, Serial Advanced Technology Attachment (SATA) specification, and Serial Attached Small Computer System Interface (SAS) specification.

20. The solid state drive of claim 16, wherein the memory controller includes a first integrated circuit chip and the memory device includes a second integrated circuit chip.

* * * * *